(12) United States Patent
Hur et al.

(10) Patent No.: US 9,281,987 B2
(45) Date of Patent: Mar. 8, 2016

(54) DIGITAL TRANSMISSION APPARATUS AND METHOD AND DIGITAL RECEPTION APPARATUS

(75) Inventors: Jong-sook Hur, Seoul (KR); Dong-hoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1058 days.

(21) Appl. No.: 12/610,695

(22) Filed: Nov. 2, 2009

(65) Prior Publication Data

US 2010/0208748 A1 Aug. 19, 2010

(30) Foreign Application Priority Data

Feb. 19, 2009 (KR) ........................ 10-2009-0013921

(51) Int. Cl.
*H04L 1/00* (2006.01)
*H04L 27/26* (2006.01)

(52) U.S. Cl.
CPC .......... *H04L 27/2626* (2013.01); *H04L 1/0079* (2013.01); *H04L 27/2602* (2013.01); *H04L 27/2647* (2013.01); *H04L 1/0031* (2013.01); *H04L 2001/0093* (2013.01)

(58) Field of Classification Search
USPC ................................................ 370/474, 312
See application file for complete search history.

(56) References Cited

U.S. PATENT DOCUMENTS

| | | | |
|---|---|---|---|
| 2001/0048717 A1* | 12/2001 | Ougi et al. ..................... | 375/231 |
| 2002/0181509 A1* | 12/2002 | Mody ................... | H04L 1/0618 370/480 |
| 2005/0177514 A1 | 8/2005 | Sasselli | |
| 2005/0226354 A1* | 10/2005 | Shin et al. ..................... | 375/346 |
| 2006/0137015 A1 | 6/2006 | Fahrny et al. | |
| 2006/0177055 A1 | 8/2006 | Yoo | |
| 2007/0019579 A1* | 1/2007 | Xu et al. ..................... | 370/312 |
| 2007/0118788 A1* | 5/2007 | Kaiki ............................. | 714/755 |
| 2010/0157912 A1* | 6/2010 | Chin .............................. | 370/329 |

FOREIGN PATENT DOCUMENTS

WO 2008/075832 A1 6/2008

OTHER PUBLICATIONS

International Search Report (PCT/ISA/210) issued Oct. 6, 2010, in related International Application PCT/KR2010/001053.
Written Opinion of the International Searching Authority (PCT/ISA/237) issued Oct. 6, 2010, in related International Application PCT/KR2010/001053.
International Search Report (PCT/ISA/210) issued Jan. 23, 2008, in PCT/KR2007/005172 (corresponding to International Publication WO 2008/075832).

(Continued)

*Primary Examiner* — Adnan Baig
(74) *Attorney, Agent, or Firm* — Sughrue Mion, PLLC

(57) ABSTRACT

A digital transmission apparatus and a method thereof and a digital reception apparatus are provided. A frame body processor converts incoming data and outputs a frame body, a system information generator generates system information, which is necessary for processing the data at a reception apparatus, by using a different processing method from the frame body processing method of the frame body processor, a frame generator multiplexes data of the frame body, a header of the frame, and the system information, thereby generating a frame, and a signal processor up-coverts a signal of the frame and transmits the signal to the reception apparatus.

21 Claims, 11 Drawing Sheets

(56) References Cited

OTHER PUBLICATIONS

Communication dated Oct. 30, 2014 issued by the State Intellectual Property Office of P.R. China in counterpart Chinese Application No. 201080008636.0.

Communication dated Nov. 27, 2014 issued by the Korean Intellectual Property Office in counterpart Korean Application No. 10-2009-0013921.

Communication dated Nov. 13, 2015 issued by the Patent Reexamination Board of the State Intellectual Property Office of China in counterpart Chinese Patent Application No. 201080008636.0.

* cited by examiner

: FRAME HEADER SYMBOL

: SYSTEM INFORMATION SYMBOL

: DATA SYMBOL

: FRAME HEADER SYMBOL

: SYSTEM INFORMATION SYMBOL

: DATA SYMBOL

DIGITAL TRANSMISSION APPARATUS AND METHOD AND DIGITAL RECEPTION APPARATUS

CROSS-REFERENCE TO RELATED APPLICATIONS

This application claims priority from Korean Patent Application No. 10-2009-13921, filed on Feb. 19, 2009, in the Korean Intellectual Property Office, the disclosure of which is incorporated herein in its entirety by reference.

BACKGROUND OF THE INVENTION

1. Field of the Invention

Apparatuses and methods consistent with the present invention relate to a digital transmission apparatus and a method thereof, and a digital reception apparatus, and more particularly, to a digital transmission apparatus and a method thereof and a digital reception apparatus for inserting system information.

2. Description of the Related Art

In a related art communication system such as a terrestrial digital broadcast, a transmission apparatus generates a signal containing system information and transmits it to a reception apparatus. The system information includes information regarding a signal structure, a channel coding method, and a modulation type. The transmission apparatus in a wireless communication system processes and outputs the system information along with a frame body. For example, if the transmission apparatus processes the system information according to the inverse fast Fourier transform (IFFT) or inverse discrete Fourier transform (IDFT), the reception apparatus removes a noise from the IFFT or IDFT-processed system information using an equalizer and then analyzes the system information. That is, a related-art transmission apparatus processes system information according to IFFT or IDFT, and thus, a reception apparatus equalizes the system information. Therefore, it may take much time to analyze the system information depending on the performance of the equalizer.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a digital transmission apparatus and a method thereof which processes system information and a frame body separately and transmits them, and a digital reception apparatus which receives the transmitted system information and frame body.

The present invention also provides a digital transmission apparatus and a method thereof, and a digital reception apparatus which uses received system information without passing it through an equalizer.

According to an aspect of the present invention, there is provided a digital transmission apparatus including: a frame body processor which converts incoming data and outputs a frame body, a system information generator which generates system information, which is necessary for processing the data at a reception apparatus, in a method different from the frame body processing method of the frame body processor, a frame generator which multiplexes data of the frame body, a frame header, and the system information, thereby generating a frame, and a signal processor which up-coverts a signal of the frame and transmits the signal to the reception apparatus.

The frame body processor may receive data of a frequency domain, convert the data of the frequency domain into data of a time domain, and output the frame body.

The frame generator may change the location into which the system information is inserted for every frame.

The frame generator may insert the system information into a plurality of separate frames.

The frame generator may arrange the frame header, the system information, and the data in sequence to generate the frame.

The frame generator may arrange the system information, the frame header, and the data in sequence to generate the frame.

The frame generator may arrange the frame header and the data in sequence to generate the frame, and may arrange the system information within the frame header.

The frame generator may distribute the system information within the frame header.

According to an aspect of the present invention, there is provided a digital transmitting method including: outputting a frame body by converting incoming data, generating system information which is necessary for processing the data at a reception apparatus in a method different from the frame body generating method, generating a frame by multiplexing data of the frame body, a header of the frame and the system information, up-converting a signal of the frame and transmitting the signal to the reception apparatus.

The frame body outputting operation may receive data of a frequency domain, convert the data of the frequency domain into data of a time domain, and generate the frame body.

The frame generating operation may change the location into which the system information is inserted for every frame.

The frame generating operation may divide and insert the system information into a plurality of separate frames.

The frame generating operation may arrange the frame header, the system information, and the data in sequence to generate the frame.

The frame generating operation may arrange the system information, the frame header, and the data in sequence to generate the frame.

The frame generating operation may arrange the frame header and the data in sequence to generate the frame and may arrange the system information within the frame header.

The frame generating operation may distribute the system information within the frame header.

According to another aspect of the present invention, there is provided a digital reception apparatus including: a synchronizer which receives a signal including a frame body and system information of the digital transmission apparatus, and synchronizes the signal, wherein the frame body has been converted by a digital transmission apparatus by using a different converting method than a method used to convert the system information; a system information processor which analyzes the system information included in the received signal, and a signal processor which equalizes the received signal based on the analyzed system information, compensates for channel distortion and corrects an error.

The frame body may be generated at the digital transmission apparatus by converting data of a frequency domain into data of a time domain.

The synchronizer may synchronize the signal in the unit of a frame.

The synchronizer may extract the system information from the synchronized signal and provide the system information to the system information processor.

The synchronizer may provide the synchronized signal to the system information processor, and the system information processor may extract the system information from the provided frame and provide the system information to the synchronizer or the signal processor.

According to still another aspect of the present invention, there is provided a digital transmission apparatus including: a converter which converts incoming data, a generator which generates system information which is necessary for processing the data at a reception apparatus in a method different from that of the converter, a signal processor which generates a signal to be transmitted by multiplexing the converted data, a header and the system information, and a transmitter which up-converts the generated signal and transmits the signal to the reception apparatus.

Accordingly, an effective digital transmission and reception system can be realized.

Additional and/or other aspects of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
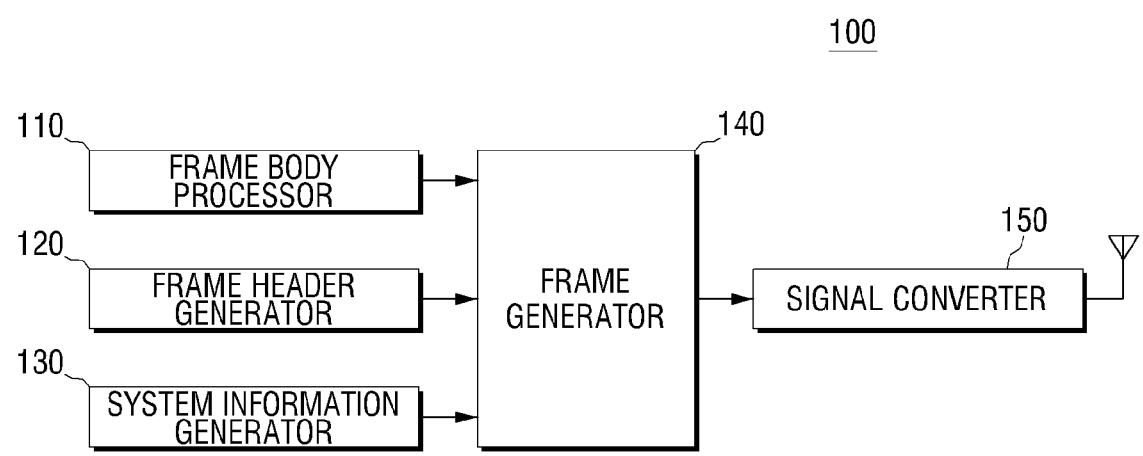
FIG. 1 is a block diagram illustrating a digital transmission apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram illustrating a digital transmission apparatus according to an exemplary embodiment of the present invention.

Referring to FIG. 1, a digital transmission apparatus 100 includes a frame body processor 110, a frame header generator 120, a system information generator 130, a frame generator 140, and a signal converter 150. The digital transmission apparatus 100 according to an exemplary embodiment of the present invention can be applied to a wireless transmission/reception system which uses orthogonal frequency division multiplexing (OFDM), code division multiple access (CDMA), or time division multiple access (TDMA).

The frame body processor 110 processes and outputs a frame body of a signal to be transmitted to a digital reception apparatus 200. The signal to be transmitted is divided into data, a frame header and system information. The frame body processor 110 may apply inverse fast Fourier transform (IFFT) or inverse discrete Fourier transform (IDFT) to data of the signal to be transmitted, or may apply another wireless communication method such as CDMA or TDMA.

The frame header generator 120 generates a frame header which is used as a training signal for the signal to be transmitted. The frame header includes a sequence for synchronization of a frame.

The system information generator 130 generates system information that is necessary for processing the data at the digital reception apparatus 200. The system information generator 130 may generate system information by using a different conversion process or generation process from a conversion or generation process used by the frame body processor 110. For example, if the frame body processor 110 applies IFFT or IDFT to generate a frame body, the frame information may not be subjected to Fourier transform.

The frame generator 140 multiplexes the data of the frame body output from the frame body processor 110, the frame header output from the frame header generator 120, and the system information output from the system information generator 130, thereby forming one of the frames illustrated in FIGS. 4 to 7, which will be described in detail below.

The frame generator 140 changes the location into which the symbols of the system information are inserted for every frame, thereby changing the structure of the frame. Also, the frame generator 140 may divide and insert the symbols of the system information into a plurality of separate frames.

The signal converter 150 converts the signal of the frame into an analog signal and performs up-conversion, thereby generating a radio frequency (RF) signal. The generated RF signal is transmitted to the digital reception apparatus 200 via an antenna.

Figure 2:
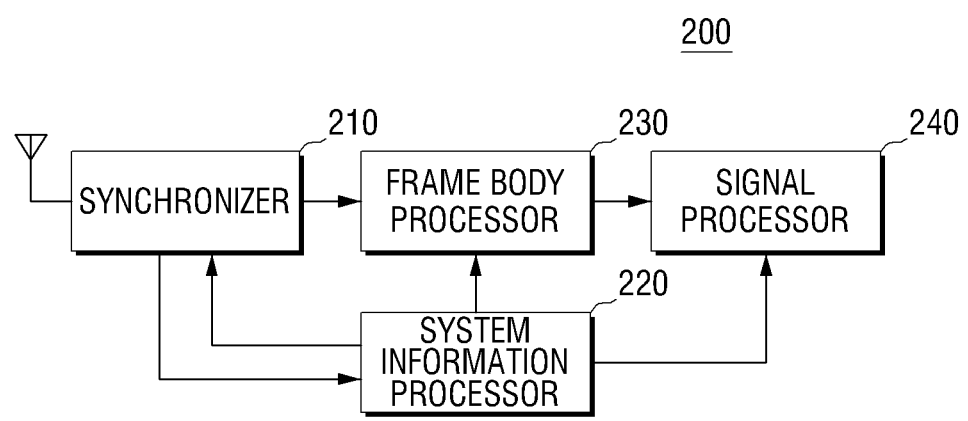
FIG. 2 is a block diagram illustrating a digital reception apparatus according to an exemplary embodiment of the present invention.

FIG. 2 is a block diagram illustrating a digital reception apparatus according to an exemplary embodiment of the present invention.

Referring to FIG. 2, a digital reception apparatus 200 includes a synchronizer 210, a system information processor 220, a frame body processor 230, and a signal processor 240.

The synchronizer 210 synchronizes the frame of the signal received from the digital transmission apparatus 100. Also, the synchronizer 210 provides the synchronized signal to the frame body processor 230, extracts system information from the synchronized signal, and provides the system information or the synchronized signal to the system information processor 220. Accordingly, the system information is not subjected to discrete Fourier transform (DFT) or fast Fourier transform (FFT) at the digital reception apparatus 200, and may not be passed through an equalizer (not shown). Also, if the digital transmission apparatus 100 transmits the system information according to CDMA or TDMA methods, the system information is not subjected to a process corresponding to the CDMA or TDMA.

The system information processor 220 analyzes the system information to determine a signal structure, a modulation method, and a coding method which has been applied to the signal for transmission by the digital transmission apparatus (for example, the apparatus of FIG. 1).

The signal processor 240 equalizes the received signal based on the determined system information, compensates for channel distortion and performs error correction.

Figure 3:
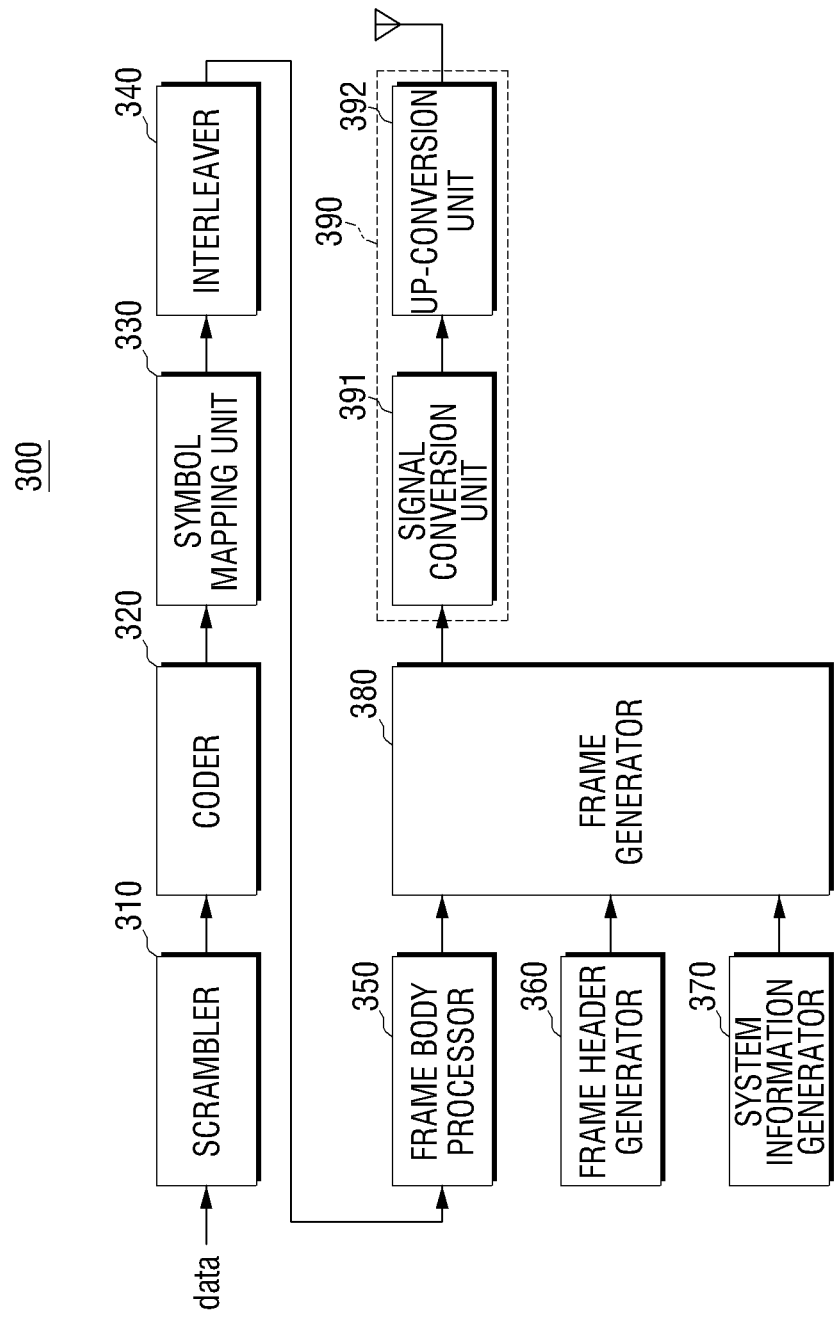
FIG. 3 is a block diagram illustrating a digital transmission apparatus according to another exemplary embodiment of the present invention.

FIG. 3 is a block diagram illustrating a digital transmission apparatus according to another exemplary embodiment of the present invention.

Referring to FIG. 3, a digital transmission apparatus 300 comprises a scrambler 310, a coder 320, a symbol mapping unit 330, an interleaver 340, a frame body processor 350, a frame header generator 360, a system information generator 370, a frame generator 380, and a signal processor 390.

The digital transmission apparatus 100, 300 is an apparatus for communicating with the digital reception apparatus 200, 800 and may be a portable device such as a cellular phone or a broadcast reception apparatus of terrestrial digital multimedia/television broadcasting (DMB-T) standard. Therefore, the digital transmission apparatus 300 according to an exemplary embodiment of the present invention can be applied to a wire/wireless system besides a digital television.

The DMB-T standard, which is a standard for a China-oriented terrestrial digital television broadcast, uses a time domain synchronous orthogonal frequency division multiplexing (TDS-OFDM) modulation method. If the TDS-OFDM method is used, the digital transmission apparatus 300 carries data in the frequency domain and transmits the data in the time domain, and the digital reception apparatus 800 receives the signal of the time domain and demodulates the signal in the frequency domain.

The scrambler 310 scrambles incoming data. Scrambling refers to randomizing data in order to solve a problem that a synchronization signal is lost since the same number of bits is repeated in the synchronous signal transmitting method.

The coder 320 codes the data input from the scrambler 310, performs forward error correction (FEC) so as to detect an error from the signal received by a digital reception apparatus (e.g., a digital reception apparatus 800) from a transport stream, and corrects the error. The method for coding the data may include an outer coding using Bose-Chaudhuri-Hochquenghem or Reed Solomon coding and an inner coding using convolution coding, turbo coding, or low density parity check coding.

The symbol mapping unit 330 modulates the data coded by the coder 320 using one of diverse modulating methods such as binary phase shift key (BPSK), quadrature phase shift keying (QPSK), 16-quadrature amplitude modulation (QAM), 64-QAM, 128-QAM, and 256-QAM, and outputs the data in the form of a data symbol.

The interleaver 340 applies symbol interleaving or subcarrrier interleaving to the data symbols which are input from the symbol mapping unit 330.

The frame body processor 350 processes and outputs a frame body of a signal to be transmitted to the digital reception apparatus 800 from among the signals input from the interleaver 340. More specifically, the frame body processor 350 performs IFFT or IDFT with respect to the data symbol input from the interleaver 340 to convert the data symbol of the frequency domain to a data symbol of a time domain, and processes the converted data symbol to generate a frame body. Also, the frame body processor 350 outputs the frame body using diverse wireless communication methods such as CDMA or TDMA.

The frame header generator 360 generates a frame header which is used as a training symbol for the signal to be transmitted, in the form of a symbol. The DMB-T uses a pseudonoise (PN) sequence as a training signal and the frame header generator 360 generates a PN sequence according to a predetermined regulation. The PN sequence is synchronization information for obtaining synchronization between the digital transmission apparatus 300 and the digital reception apparatus 800.

The system information generator 370 generates system information necessary for processing data at the digital reception apparatus 800 in the form of a symbol. The system information is generated separate from the frame body and may be inserted in each frame or each super frame consisting of a plurality of frames. For example, the system information is generated without being subjected to IFFT or IFFT or is generated by a separate process different from that of the frame body in the CDMA or TDMA method.

The system information includes the structure of a signal to be transmitted, information regarding channel coding, and a modulation method. The information regarding channel coding includes an inner coding rate, an interleaving mode, and an outer coding rate of the signal.

The frame generator 380 multiplexes the data of the frame body output from the frame body processor 350, the frame header output from the frame header generator 360, and the system information output from the system information generator 370, thereby generating a frame. More specifically, the frame generator 380 multiplexes the symbols of the data, the symbols of the frame header, and the symbols of the system information, thereby generating a frame.

The frame generator 380 changes the location into which the symbols of the system information are inserted in the frame for every symbol, thereby changing the structure of the frame. Also, the frame generator 380 may divide and insert the symbols of the system information into a plurality of separate frames.

FIGS. 4 to 7 are views illustrating diverse examples in which the symbols of the system information are inserted. In FIGS. 4 to 7, the frame header may be the symbol of the frame header, the system information may be the symbol of the system information, and the data may be the symbol of the data.

Figure 4:
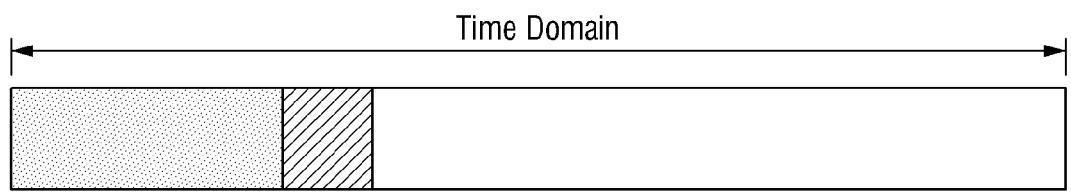
FIGS. 4 to 7 are views illustrating diverse examples in which a symbol of system information is inserted.

Referring to FIG. 4, the frame generator 380 arranges the frame header, the system information, and the data in the time domain in sequence to form a frame. The data is arranged in the frame body to which DFT is applied by the digital reception apparatus. For example, the frame body includes 3780 data streams.

Figure 5:
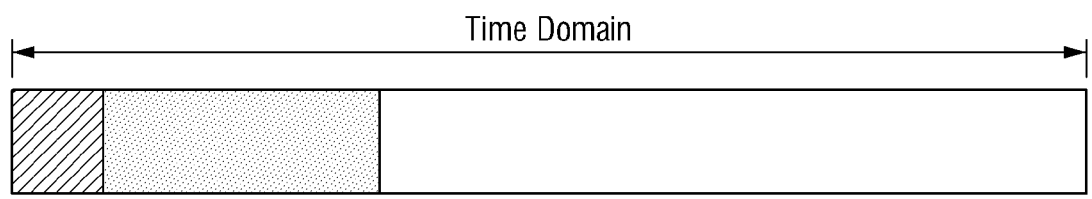
Figure 5:
Figure 5:
Figure 5:

Referring to FIG. 5, the frame generator 380 arranges the system information, the frame header and the data in sequence to form a frame. That is, the frame generator 380 arranges the symbols of the system information, the symbols of the frame header, and the symbols of the data in sequence to form a frame.

Figure 6:
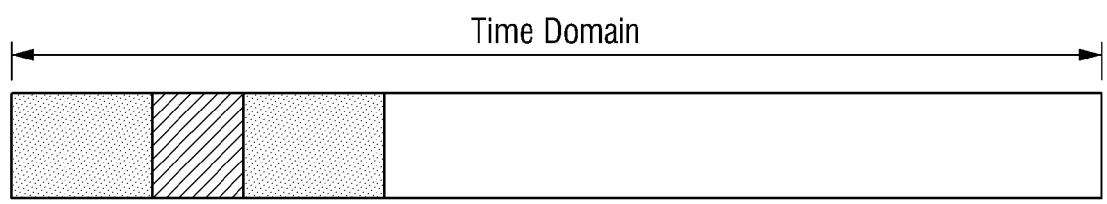
Figure 6:
Figure 6:
Figure 6:

Referring to FIG. 6, the frame generator 380 arranges the frame header and the data in sequence and then arranges the system information within the frame header, thereby generating a frame. That is, the frame generator 380 arranges the symbols of the frame header and the symbols of the data in sequence and then arranges the symbols of the system information within the frame header, thereby generating a frame.

Figure 7:
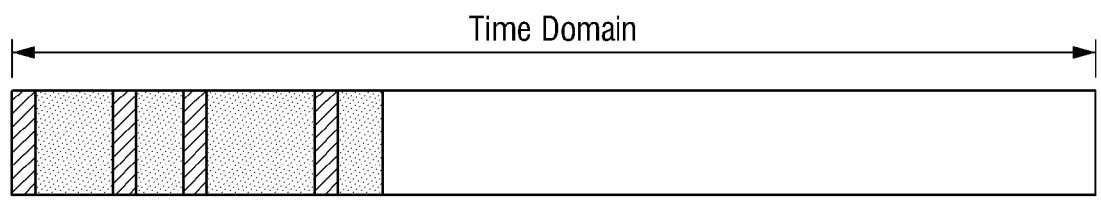
Figure 7:
Figure 7:
Figure 7:

Referring to FIG. 7, the frame generator 380 arranges the frame header and the data in sequence and then distributes the system information within the frame header, thereby generating a frame. That is, the frame generator 380 arranges the symbols of the frame header and the symbols of the data in sequence and then distributes the symbols of the system information within the frame header. If the frame is formed as in FIG. 7, it is possible to prevent loss of system information at the digital reception apparatus 800 due to an error occurring during the transmitting operation. That is, the digital reception apparatus 800 restores the system information randomly arranged as shown in FIG. 7 more effectively.

The signal processor 390 up-coverts the signal of the frame and transmits it to the digital reception apparatus 800 via an antenna. The signal processor 390 includes a signal conversion unit 391 and an up-conversion unit 392.

The signal conversion unit 391 inserts a guard interval (GI) into the data symbol to prevent an inter-symbol interference and converts the signal of the frame signal into an analog signal. The GI is a signal which is used for reducing interference of multipath channels caused by the characteristic of OFDM and insertion of the GI is optional.

The up-conversion unit 392 up-converts the analog signal to generate a RF signal. The RF signal is transmitted to the digital reception apparatus via an antenna.

Figure 8:
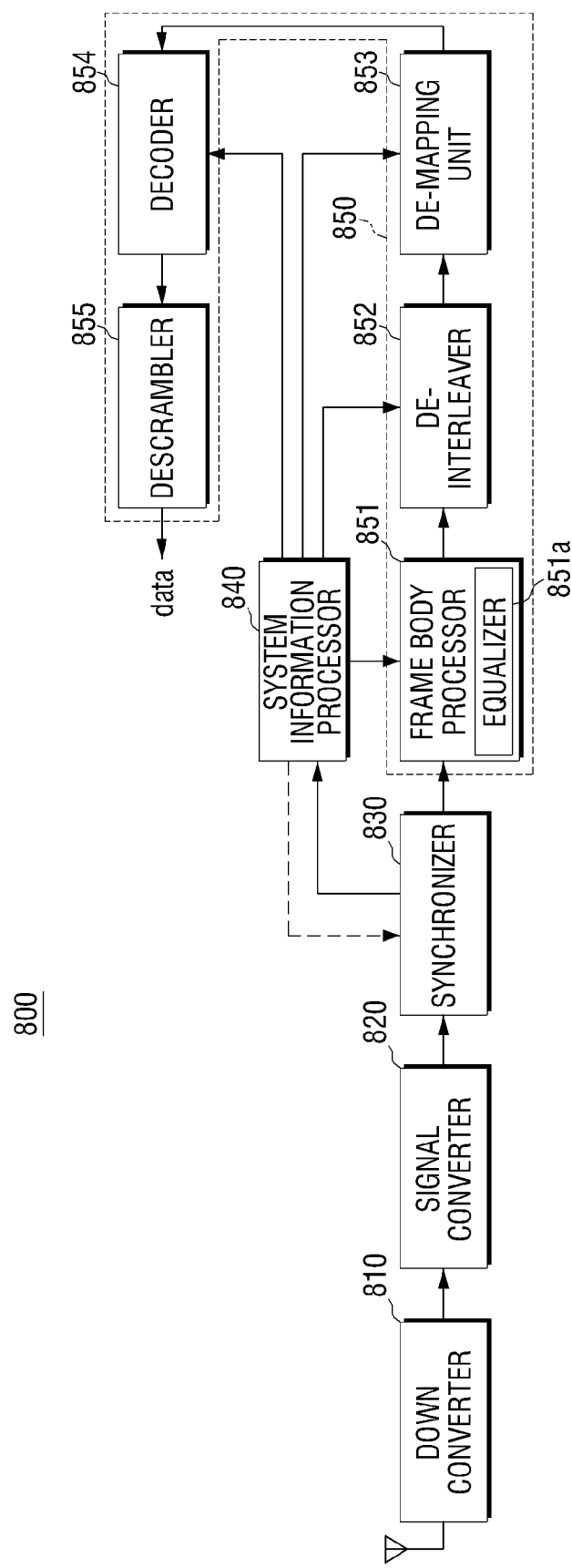
FIG. 8 is a block diagram illustrating a digital reception apparatus according to another exemplary embodiment of the present invention.

FIG. 8 is a block diagram illustrating a digital reception apparatus according to another exemplary embodiment of the present invention.

Referring to FIG. 8, a digital reception apparatus 800 includes a down converter 810, a signal converter 820, a synchronizer 830, a system information processor 840, and a signal processor 850.

The down converter 810 down-converts the signal received via an antenna. If the digital converter 800 is a broadcast reception apparatus of the DMB-T standard, the down converter 810 filters the frequency of a tuned channel and converts the RF band signal of the filtered frequency into a base band signal.

The signal converter 820 adjusts the gain of the signal using automatic gain control (AGC) to normalize the output of the down-converted signal, and performs analog-digital converting (ADC) with respect to the gain-adjusted signal. If a GI is inserted into the received signal, the signal converter 820 removes the GI from the symbol of the OFDM which is a digital signal.

The synchronizer 830 synchronizes the frame of the signal received from the digital transmission apparatus 300. Accordingly, the synchronizer 830 determines a frame start of the signal output from the signal converter 820 using a PN sequence so that the data can be processed.

Also, the synchronizer 830 provides the synchronized signal to the frame body processor 851, extracts system information from the synchronized signal and provides it to the system information processor 840 or provides the synchronized signal to the system information processor 840. Accordingly, the system information is not necessarily subjected to FFT or DFT at the digital reception apparatus 800 and may not be passed through an equalizer 851a. The time taken to analyze the system information, depending on the performance of the equalizer 851a, can be reduced. Also, if the digital transmission apparatus 300 transmits system information according to CDMA or TDMA method, the system information is not subjected to a process corresponding to the CDMA or TDMA method.

The system information processor 840 analyzes the signal of the system information provided from the synchronizer 830 or extracts the system information from the synchronized signal provided from the synchronizer 830 to determine the system information which has been applied by the digital transmission apparatus 300. The system information is provided to the synchronizer 830, the frame body processor 851, a de-interleaver 852, a symbol de-mapping unit 853, or a decoder 854 according to the characteristics of the system information. Providing the system information to the synchronizer 830 may be optional depending on the designer or the transmission/reception system.

The system information includes diverse information depending on the system, such as timing information indicating what numbered frame the system information is, an interleaving mode, a modulation method, and a coding method.

The signal processor 850 equalizes the received signal based on the determined system information, compensates for channel distortion and corrects any detected error. The signal processor 850 includes the frame body processor 851, the de-interleaver 852, the symbol de-mapping unit 853, the decoder 854, and a descrambler 855.

The frame body processor 851 performs FFT or DFT with respect to a data symbol of the signal input from the synchronizer 830 that is located in the frame body, thereby converting the data symbol into a symbol of a frequency domain. The equalizer 851a removes a noise from the data symbols to compensate for the channel distortion of the received data. Also, if the digital transmission apparatus 100 transmits system information according to the CDMA or TDMA method, the frame body processor 851 performs an operation corresponding to the CDMA or TDMA method.

The de-interleaver 852 de-interleaves the data symbols input from the frame body processor 851.

The symbol de-mapping unit 853, which is applied as a demodulator, de-maps the de-interleaved data symbol. The symbol de-mapping unit 853 de-maps the symbol using a demodulation method corresponding to the modulation method used by the digital transmission apparatus 300. That is, the symbol de-mapping unit 853 checks the modulation method provided from the system information processor 840 and uses the demodulation method corresponding to the checked modulation method. The demodulation method includes a BPSK demodulation method, a QPSK demodulation method, 16-QAM, 64-QAM, 128-QAM, and 256-QAM.

The decoder 854 decodes the data input from the symbol de-mapping unit 853 to correct a detected error. The method for correcting an error includes forward error correction (FEC). The decoder 854 decodes the data using a decoding method corresponding to the coding method and the coding rate provided from the system information processor 840.

The method for decoding the data includes an inner decoding using convolution decoding, turbo decoding, or LDPC decoding and an outer decoding using BCH decoding or RS decoding.

The descrambler 855 descrambles the data input from the decoder 854.

Figure 9:
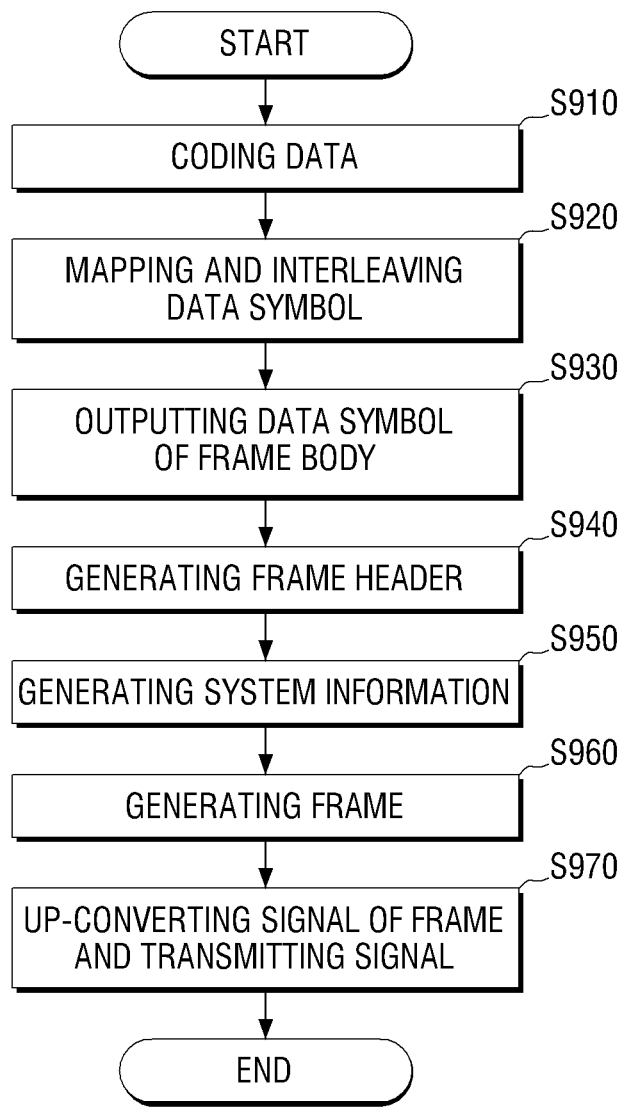
FIG. 9 is a flowchart illustrating a digital transmitting method of a digital transmission apparatus according to an exemplary embodiment of the present invention.

FIG. 9 is a flowchart illustrating a digital transmitting method of the digital transmission apparatus according to an exemplary embodiment of the present invention.

Referring to FIGS. 3 to 9, the coder 320 codes scrambled data and performs FEC (operation S910).

The symbol mapping unit 330 modulates the coded data using a modulation method and outputs the data in the form of a data symbol, and the interleaver 340 interleaves the data symbols (operation S920).

The frame body processor 350 applies IFFT, IDFT, CDMA or TDMA to the data symbol interleaved in operation S920 and generates a frame body (operation S930).

The frame header generator 360 generates a frame header, which is used as a training signal for a signal to be transmitted, in the form of a symbol (operation S940), and the system information generator 370 generates system information, which is necessary for processing data at the digital reception apparatus 800, in the form of a symbol (operation S950).

The frame generator 380 multiplexes the symbols of the data, the symbols of the frame header, and the symbols of the system information which are generated in operations (S930-S950), and generates a frame (operation S960).

The signal processor 390 up-converts the signal of the frame generated in operation S960 and transmits the signal to the digital reception apparatus 800 via an antenna (operation S970).

Figure 10:
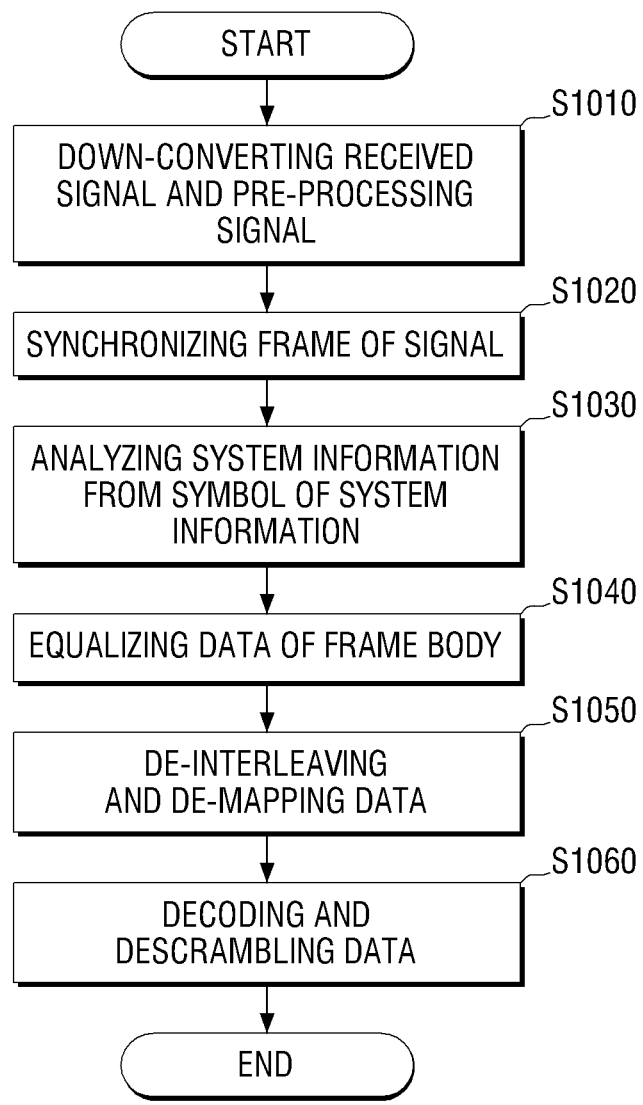
FIG. 10 is a flowchart illustrating a receiving method of a digital reception apparatus according to an exemplary embodiment of the present invention.

FIG. 10 is a flowchart illustrating a receiving method of the digital reception apparatus according to an exemplary embodiment of the present invention.

Referring to FIGS. 3 to 10, the down converter 810 down-converts the signal received via an antenna and processes the signal into a signal suitable for the base band through gain adjustment or ADC (operation S1010).

The synchronizer 830 synchronizes the frame of the signal received from the digital transmission apparatus 300, provides the synchronized signal to the frame body processor 851, extracts the system information from the synchronized signal and provides it to the system information processor 840, or provides the synchronized signal to the system information processor 840 (operation S1020).

The system information processor 840 analyzes the system information and determines system information which has been applied by the digital transmission apparatus 300 (operation S1030). The determined system information is used for processing data.

The frame body processor 851 performs FFT or DFT with respect to the data symbol of the signal provided in operation (S1020) that is located in the frame body and converts the data symbol into a symbol of a frequency domain, and equalizes the data symbol using the equalizer 851a (operation S1040). If the digital transmission apparatus 100 transmits system information according to the CDMA or TDMA method, the frame body processor 851 performs an operation corresponding to the CDMA or TDMA method in operation S1040.

The de-interleaver 852 de-interleaves the equalized data symbols according to the interleaving mode of the system information which has been determined by the system information processor 840, and the symbol de-mapping unit 853 de-maps the de-interleaved data symbol (operation S1050).

The decoder 854 decodes the de-mapped data and performs error correction, and the descrambler 855 descrambles the decoded data (operation S1060). The symbol de-mapping unit 853 uses a demodulation method corresponding to the modulation method provided from the system information processor 840 in operation (S1050), and the decoder 854 uses a decoding method corresponding to the coding method provided from the system information processor 840 in operation (S1060).

Although the digital transmission apparatus 300 transmits a signal to the digital reception apparatus 800 in the unit of a frame in the above exemplary embodiments, this is merely an example. The unit for transmitting a signal is not limited.

Also, in the digital transmission apparatus 300, the system information does not pass the frame body processor 851 and is generated by the system information generator 840 separate from the frame body. Accordingly, the system information is not subjected to a process which is necessary to the IDFT, IFFT, CDMA or TDMA, and as a result, may not be subjected to a process corresponding to DFT, FFT, CDMA or TDMA at the digital reception apparatus 800 and may not be equalized by the equalizer 851a. Therefore, the time required to analyze the system information, depending on the performance of the equalizer 851a of the digital reception apparatus 800, can be reduced.

Also, the digital transmission apparatus 300 changes the location into which the symbols of the system information are inserted for every frame, and particularly, if the symbols are inserted as shown in FIG. 7, the loss of the system information that may occur at the digital reception apparatus 800 can be minimized.

Figure 11:
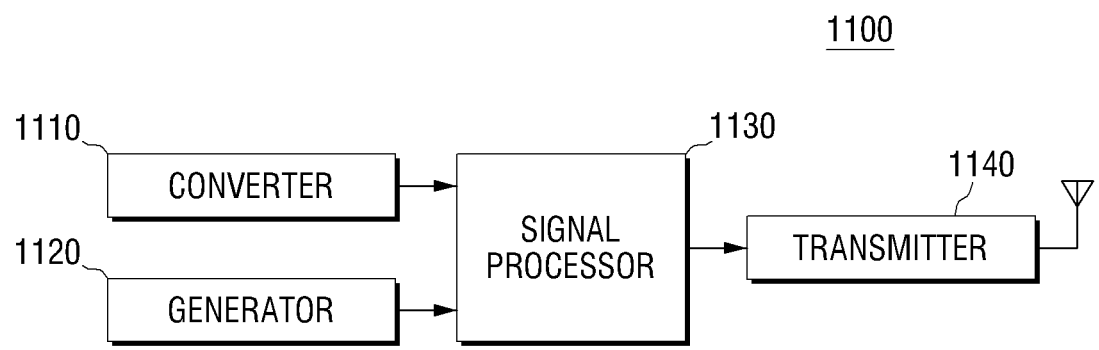
FIG. 11 is a block diagram illustrating a digital transmission apparatus according to another exemplary embodiment of the present invention.

FIG. 11 is a block diagram illustrating a digital transmission apparatus according to another exemplary embodiment of the present invention.

Referring to FIG. 11, a digital transmission apparatus 1100 includes a converter 1110, a generator 1120, a signal processor 1130, and a transmitter 1140. The digital transmission apparatus 1100 transmits a signal to a digital reception apparatus (not shown) in a wire/wireless system.

The converter 1110 converts incoming data of a frequency domain into data of a time domain.

The generator 1120 generates system information which is necessary for processing data at the digital reception apparatus (not shown). The system information is information regarding a signal transmitted from the digital transmission apparatus 1100, for example, and includes coding information.

The signal processor 1130 multiplexes converted data, a header, and generated system information to generate a signal to be transmitted.

The transmitter 1140 up-converts the generated signal and transmits it to the digital reception apparatus in wire or wireless communication method.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A digital transmission apparatus, comprising:
   a frame body processor which processes data by applying inverse fast Fourier transform (IFFT) or inverse discrete Fourier transform (IDFT) and generate a frame body including the processed data;
   a system information generator which generates system information;
   a frame generator which multiplexes the frame body, a frame header, and the system information, thereby generating a frame; and
   a signal processor which up-converts a signal of the frame and transmits the signal to a reception apparatus which processes the data based on the system information,
   wherein the system information generator generates the system information without applying the IFFT or the IDFT when the frame body processor applies the IFFT or the IDFT to the data to generate the frame body, and
   wherein the system information is not equalized by the reception apparatus: and
   wherein the system information comprises at least one of an interleaving mode, an inner coding rate, an outer coding rate, and a modulation method.

2. The digital transmission apparatus as claimed in claim 1, wherein the frame generator establishes the location at which the system information is inserted into each frame on a frame-by-frame basis.

3. The digital transmission apparatus as claimed in claim 1, wherein the frame generator divides the system information and inserts the divided system information into a plurality of separate frames.

4. The digital transmission apparatus as claimed in claim 1, wherein the frame generator arranges the frame header, the system information, and the data in sequence to generate the frame.

5. The digital transmission apparatus as claimed in claim 1, wherein the frame generator arranges the system information, the frame header, and the data in sequence to generate the frame.

6. The digital transmission apparatus as claimed in claim 1, wherein the frame generator arranges the frame header and the data in sequence to generate the frame, and arranges the system information within the frame header.

7. The digital transmission apparatus as claimed in claim 6, wherein the frame generator distributes the system information within the frame header.

8. A digital transmitting method for a transmitting apparatus, comprising:
processing data by applying inverse fast Fourier transform (IFFT) or inverse discrete Fourier transform (IDFT) and generating a frame body comprising the processed data;
generating system information;
generating a frame by multiplexing the frame body, a frame header and the system information; and
up-converting a signal of the frame and transmitting the signal to the reception apparatus,
wherein the system information generator generates the system information without applying the IFFT or the IDFT when the frame body processor applies the IFFT or the IDFT to the data to generate the frame body; and
wherein the system information comprises at least one of an interleaving mode, an inner coding rate, an outer coding rate, and a modulation method.

9. The digital transmitting method as claimed in claim 8, wherein the generating of the frame comprises:
establishing the location at which the system information is inserted into each frame on a frame-by-frame basis.

10. The digital transmitting method as claimed in claim 8, wherein the generating of the frame comprises:
dividing and inserting the system information into a plurality of separate frames.

11. The digital transmitting method as claimed in claim 8, wherein the generating of the frame comprises:
arranging the frame header, the system information, and the data in sequence to generate the frame.

12. The digital transmitting method as claimed in claim 8, wherein the generating of the frame comprises:
arranging the system information, the frame header, and the data in sequence to generate the frame.

13. The digital transmitting method as claimed in claim 8, wherein the generating of the frame comprises:
arranging the frame header and the data in sequence to generate the frame, and arranging the system information within the frame header.

14. The digital transmitting method as claimed in claim 13, wherein the generating of the frame comprises:
distributing the system information within the frame header.

15. A digital reception apparatus, comprising:
a synchronizer which receives a signal comprising a frame body which has been generated by applying inverse fast Fourier transform (IFFT) or inverse discrete Fourier transform (IDFT) to data, and system information of a digital transmission apparatus, and synchronizes the signal;
a system information processor which analyzes the system information included in the received signal; and
a signal processor which equalizes the received signal based on the analyzed system information, compensates for channel distortion and corrects a detected error,
wherein a system information generator at the digital transmission apparatus generates the received system information without applying the IFFT or the IDFT when the frame body is generated by applying the IFFT or the IDFT to the data to generate the frame body, and
wherein the signal processor equalizes the received signal based on the analyzed system information without passing the system information through an equalizer; and
wherein the system information comprises at least one of an interleaving mode, an inner coding rate, an outer coding rate, and a modulation method.

16. The digital reception apparatus as claimed in claim 15, wherein the synchronizer synchronizes the signal in the unit of a frame.

17. The digital reception apparatus as claimed in claim 16, wherein the synchronizer extracts the system information from the synchronized signal and provides the system information to the system information processor.

18. The digital reception apparatus as claimed in claim 16, wherein the synchronizer provides the synchronized signal to the system information processor, and the system information processor extracts the system information from the frame and provides the system information to the synchronizer or the signal processor.

19. A digital transmission apparatus, comprising:
a converter which converts incoming data;
a processor which processes the incoming data by applying inverse fast Fourier transform (IFFT) or inverse discrete Fourier transform (IDFT) and generates a frame body including the processed data;
a generator which generates system information;
a signal processor which generates a signal to be transmitted by multiplexing the converted data, a header and the system information; and
a transmitter which up-converts the generated signal and transmits the signal to the reception apparatus,
wherein the system information is generated without applying the IFFT or the IDFT when the processor applies the IFFT or the IDFT to the data to generate the frame body; and
wherein the system information comprises at least one of an interleaving mode, an inner coding rate, an outer coding rate, and a modulation method.

20. The digital reception apparatus as claimed in claim 15, wherein a frame generator of the digital transmission apparatus establishes the location at which the system information is inserted into each frame on a frame-by-frame basis.

21. The digital reception apparatus as claimed in claim 19, wherein the signal processor establishes the location at which the system information is inserted into each signal on a signal-by-signal basis.

* * * * *